United States Patent [19]

Burtis

[11] Patent Number: 5,661,354

[45] Date of Patent: Aug. 26, 1997

[54] HIGH TORQUE DC ELECTRIC MOTOR WITH SIMULTANEOUS BATTERY CHARGING SYSTEM

[76] Inventor: Wilson A. Burtis, 5011 Harvard Ave., Westminster, Calif. 92683

[21] Appl. No.: 286,441

[22] Filed: Aug. 3, 1994

[51] Int. Cl.[6] .................... H02K 49/00; H02K 21/26; H02K 5/00
[52] U.S. Cl. .................... 310/113; 310/154; 310/89
[58] Field of Search ...................... 310/113, 152, 310/154, 156, 254, 261, 114

[56] References Cited

U.S. PATENT DOCUMENTS

| | | | |
|---|---|---|---|
| 2,279,690 | 4/1942 | Lindsey | 310/113 |
| 2,511,412 | 6/1950 | Myrmirides | 310/113 |
| 2,538,119 | 1/1951 | Mironowicz | 310/113 |
| 3,823,919 | 7/1974 | Benedikter | 259/2 |
| 3,831,942 | 8/1974 | Del Mar | 272/73 |
| 4,019,103 | 4/1977 | Davis et al. | 318/37 |
| 4,082,968 | 4/1978 | Jones | 310/68 B |
| 4,121,668 | 10/1978 | Miner | 172/42 |
| 4,138,629 | 2/1979 | Miller et al. | 318/140 |
| 4,237,395 | 12/1980 | Loudermilk | 310/113 |
| 4,259,604 | 3/1981 | Aoki | 310/113 |
| 4,358,693 | 11/1982 | Palmer et al. | 310/46 |
| 4,382,190 | 5/1983 | Jacobson | 290/55 |
| 4,392,073 | 7/1983 | Rosenberg, Jr. | 310/216 |
| 4,482,830 | 11/1984 | Iwaki et al. | 310/113 |
| 4,501,983 | 2/1985 | Schmider | 310/113 |
| 4,503,349 | 3/1985 | Miller | 310/178 |
| 4,517,471 | 5/1985 | Sachs | 310/67 |
| 4,521,349 | 6/1985 | Weber et al. | 261/93 |
| 4,602,173 | 7/1986 | Briscoe et al. | 310/1 |
| 4,720,662 | 1/1988 | Lanser | 318/138 |
| 4,792,237 | 12/1988 | Hara | 366/296 |
| 4,804,439 | 2/1989 | Frederickson | 162/55 |
| 4,908,540 | 3/1990 | Motodate et al. | 310/240 |

*Primary Examiner*—Steven L. Stephan
*Assistant Examiner*—Michael Wallace, Jr.
*Attorney, Agent, or Firm*—Gene Scott - Patent Law & Venture Group

[57] ABSTRACT

A DC electric motor system includes a rotor portion having a commutator and a coil winding mounted radially about a shaft, and a stator portion including two rows of spaced permanent magnets about either side of the rotor coil winding. Pick-up coils are mounted about the circumference of the electric motor to pick up energy produced by the change in magnetic flux about the edges of the rotor coil winding. The pick-ups coils transfer the collected energy as current for use in charging a battery within an electric vehicle, or the like.

6 Claims, 5 Drawing Sheets

HIGH TORQUE DC ELECTRIC MOTOR WITH SIMULTANEOUS BATTERY CHARGING SYSTEM

BACKGROUND OF THE INVENTION

1. Field of the Invention

The present invention relates to permanent magnet DC motors and, more particularly, to electric motors which provide new and improved operation with simultaneous battery regenerating without interfering with the operation of the motor driving system.

2. Description of the Related Art

Exemplary type permanent magnet and direct current motor systems are disclosed in U.S. Pat. Nos. 5,117,141; 4,371,801; 4,358,693; 4,237,410; 4,169,983; 3,996,504; 3,633,084; 3,418,506; and 3,334,254.

Electrical battery systems known in the art suffer from various drawbacks which prevent such systems from achieving maximum performance and reliability. Such problems include a lack of simultaneously charging a long lasting battery energy supply during operation of an electrical battery system. It would, therefore, represent an advance in the art to provide a new improved simultaneous direct current charging system which acts to charge the batteries of a vehicle such as an electric car without having to stop the vehicle.

SUMMARY OF THE INVENTION

A new electrodynamic motor with a simultaneous electric generating system is described. The system includes a new self-regenerating electrical DC permanent magnet system which charges the vehicle power supply without interfering with the operation of the vehicle.

In accordance with another aspect of the invention, two or more rows of individual cross-sectional charged permanent magnets are included within the DC motor of the present invention.

In accordance with a further aspect of the present invention, the DC motor includes an aluminum electrical armature brush support and drive mount so there is no interference with the permanent magnet electrical force supply system.

In accordance with a still further aspect of the present invention, the rows of permanent magnets are adjustable so that the magnets can be situated in a position to provide maximum force output.

In accordance with another aspect of the invention, the armature winding is for a 6-pole rotor system and battery charging pick-up coil operation.

In accordance with yet another aspect of the present invention, the electric battery regenerating pick-up coil and magnum mounting system are formed on a 10–18 magnet iron to ensure a complete uninterrupted charge cycle of use.

In accordance with a still further aspect of the invention, the armature and bearing is fixed to stop any lateral movement of the rotor to prevent brush wear and to hold the rotor to a fixed position with respect to the permanent magnets.

BRIEF DESCRIPTION OF THE DRAWINGS

These and other features and advantages of the present invention will become more apparent from the following detailed description of an exemplary embodiment thereof, as illustrated in the accompanying drawings in which.

DETAILED DESCRIPTION OF THE INVENTION

Figure 1A:
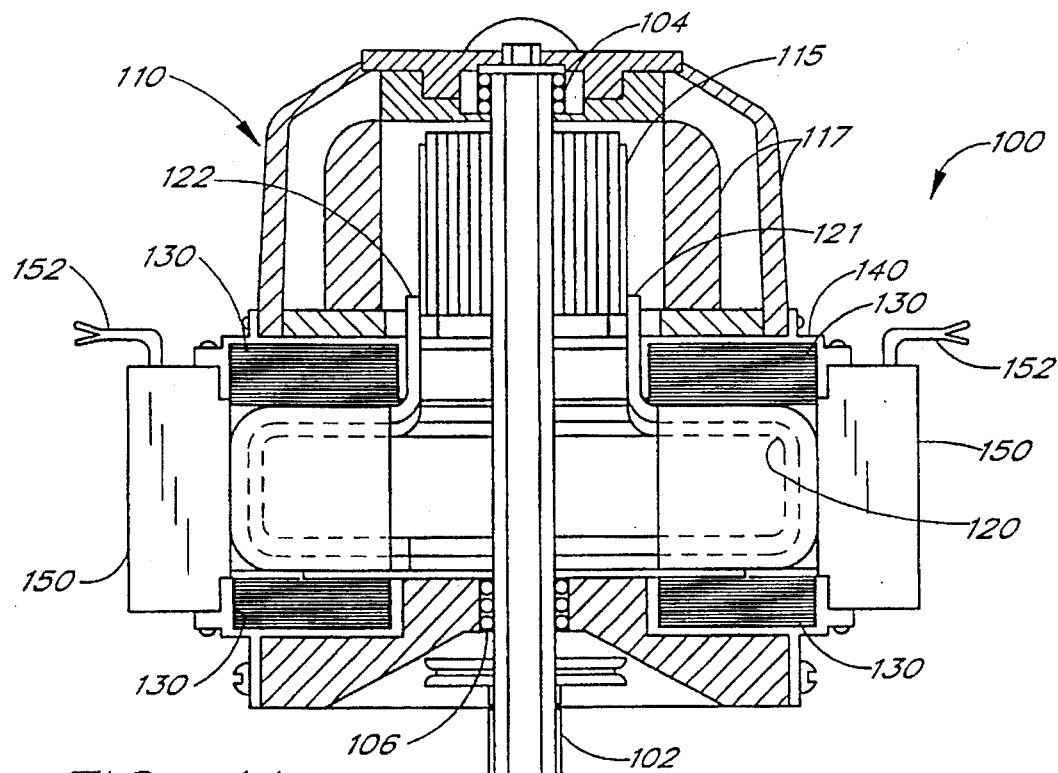
FIGS. 1A and 1B are, respectively, a longitudinal cross-sectional view and a top plan view, of the electric assembly with the splined motor shaft, ball bearings at both ends, a commutator and bearing locked to the brush end support frame, a movable drive and bearing, and an aluminum mounting.
Figure 1B:
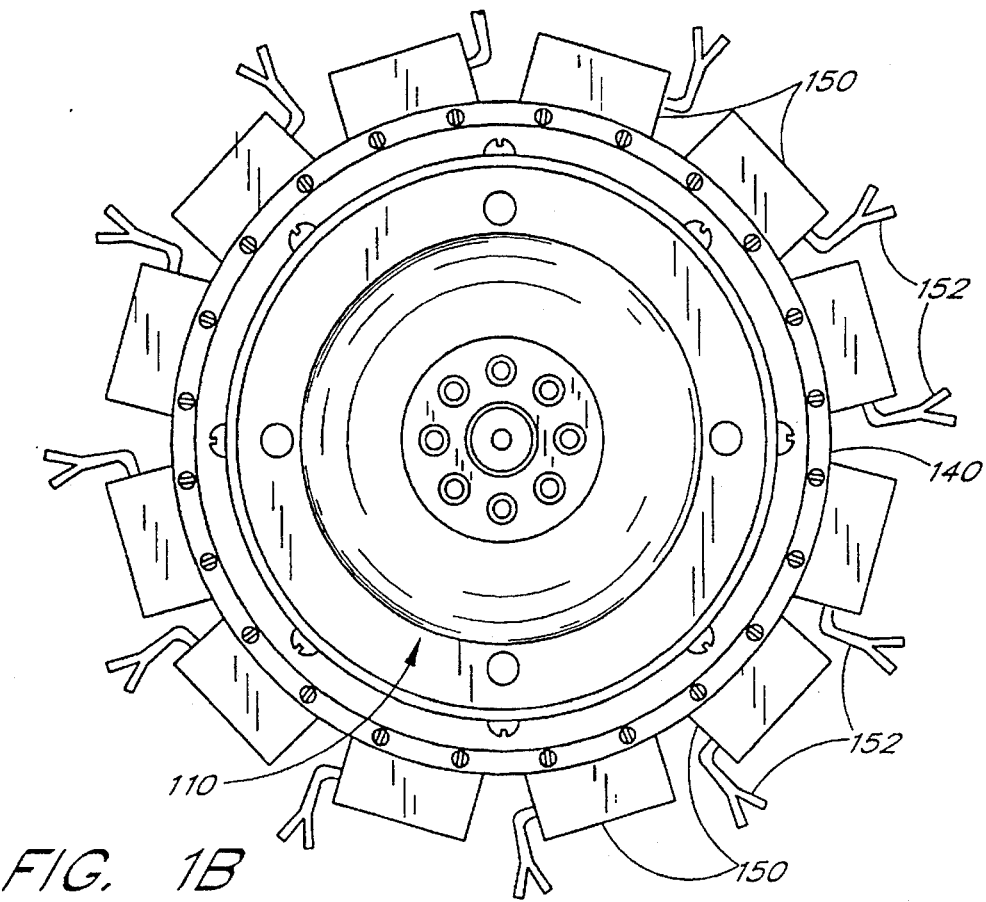

FIGS. 1A and 1B show, respectively, an elevational cross-sectional view and a top plan view of a DC electrical motor 100. As shown in FIG. 1A, the electrical motor 100 includes a splined rotatable shaft 102 which may, for example, engage with a drive shaft of an electric car or other electric vehicle. The splined motor shaft 102 is supported within the motor 100 via a commutator end bearing including ball bearings 104, and a movable drive end bearing including ball bearings 106.

The DC electric motor 100 includes a chassis 110 comprising a armature brush support portion 117, which is advantageously constructed from a non-ferrous metal such as aluminum, and a housing portion 140 connected to the brush support portion 117 of the motor chassis 110.

Housed within the armature brush support portion 117 is a commutator 115 which, as is well known to the art, is used to provide a point of electrical connection between a conductive brush (not shown) and a coil winding 120 within the electrical motor 100. The coil winding 120 connects with the commutator at points 121, 122 depicted in FIG. 1A. The coil winding 120 is wound within a three-faced wiring slot.

Pairs of permanent magnets 130 are spaced apart on opposite sides of the coil winding 120 as shown in FIG. 1A. As will be described in greater detail below, the permanent magnets 130 are arranged in a 6-pole configuration above and below the coil winding 120, and have an adjustable position to provide for maximum force output of the DC electric motor 100. That is, by precisely adjusting the positions of the magnets, measurements of the output torque can be used to arrive at the optium force position of the magnets 130. In the six-pole configuration depicted in the Figures (e.g., see FIG. 3), six of the permanent magnets 130 arranged in a circle, where each of the poles alternate in polarity, define a row of permanent magnets. Thus, FIG. 1 depicts, in cross-section, two rows of permanent magnets spaced apart on opposite sides of the coil winding 120 (i.e., one row of magnets above the coil winding 120 and one row of magnets below the coil winding 120). That is, the two rows of permanent magnets are axially spaced along the shaft 102, as shown in FIG. 1A. Furthermore, as is well understood in the art, the position of permanent magnets in a DC electric motor affects the torque output by the motor. Thus, it is well know that the orientation of the two rows of magnets can be empirically adjusted by rotating one or both of the rows of magnets about the axis defined by the shaft 102, into a position which results in a greater force output by the motor 100. The magnets 130 are supported within the permanent magnet housing 140 which also provides a mounting for a plurality of pick-up coils 150 arranged around the circumference of the DC motor 100. The housing 140 is advantageously constructed from 10–18 material which is well-known in the art to be a low-carbon, open-hearth steel with high manganese content, as defined in ASTM standard 1018. The use of 10–18 material has been found to be advantageous since this ensures that there is a complete interrupted charge cycle. That is, the magentic flux energy is prevented from escaping as stray energy from the system due to the high permeability of the material of the housing 140. The pick-up coils 150 include charging output wires 152 for supplying current to charge batteries (not shown) within the vehicle.

In operation, electric current supplied to the coil winding 120 via the commutator 115 causes the rotor, or commutator, assembly within the DC motor 100 to rotate relative to the stator portion of the motor 100. The method by which electrical signals are supplied to the coil 120 via the commutator 115 in order to cause the rotor assembly to rotate at a selected speed is well known in the art and will not be described in detail here.

As the coil windings 120 rotate within the housing 140, due to the energy supply to the coil via the commutator 115 and the magnetic flux generated by the magnets 130, the current flowing through the coil windings 120 in turn generates a magnetic field in concentric circles around the wires within the coil winding 120. Thus, as the coil winding 120 rotates past the pick-up coils 150 on the circumference of the DC motor 100, lines of magnetic flux generated around the coil winding 120 cut the conductive wires (not shown in FIG. 1A) within the pick-ups 150. As the lines of magnetic flux cut the conductive wires within the pick-ups 150, a current is induced in these wires and is output from the pick-up coils 150 via the wires 152. Thus, excess magnetic flux produced around the edges of the DC motor 100 is not wasted, but is transformed into a source of electrical energy used to charge the batteries of the electric vehicle system. In one advantageous embodiment, the pick-up coil output connected to the battery is under the control of a positive directed diode control circuit and the diode directs a positive charge to the battery while the rotor assembly is spinning.

It will be appreciated by those skilled in the art, that the faster the coil 120 rotates, the greater the current which will be induced within the pick-up coils 150. Thus, the energy output by the pick-up coils 150 is approximately proportional to the rotation rate of coil windings 120. It will, furthermore, be appreciated that, when electrical current ceases to be supplied to the coil winding 120 via the commutator 115, the moment of inertia of the coil winding 120 will cause the coil winding 120 to continue rotating within the DC motor 100. Thus, although no current is supplied via the commutator 115, the motion of the coil winding 120 past the permanent magnets 130 on either side of the coil winding 120 induces a reverse current within the coil winding 100 that, in turn, induces a current within the pick-up coils 150 in the opposite direction. Furthermore, the magnetic resistance due to the coupling of electric current between the coil winding 120 and the pick-up coils 150 acts to slow the rotation of the rotor assembly so that a kind of automatic breaking is performed in accordance with the present invention.

Figure 2A:
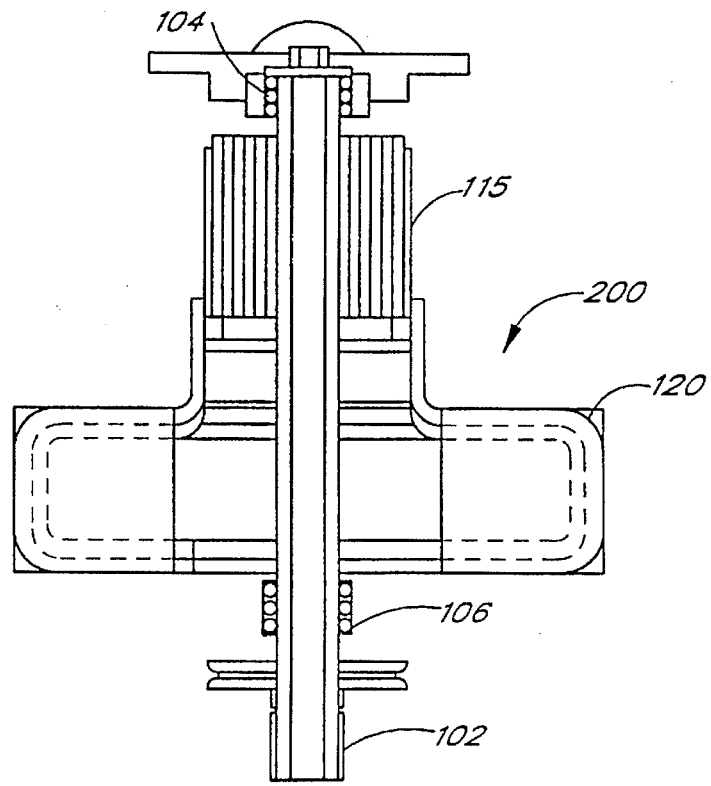
FIG. 2A is a longitudinal cross-sectional view of the commutator assembly with wiring to show the radius of the wire required at the outside corners to reduce excess corner flux to the charged pick-up coils.
Figure 2B:
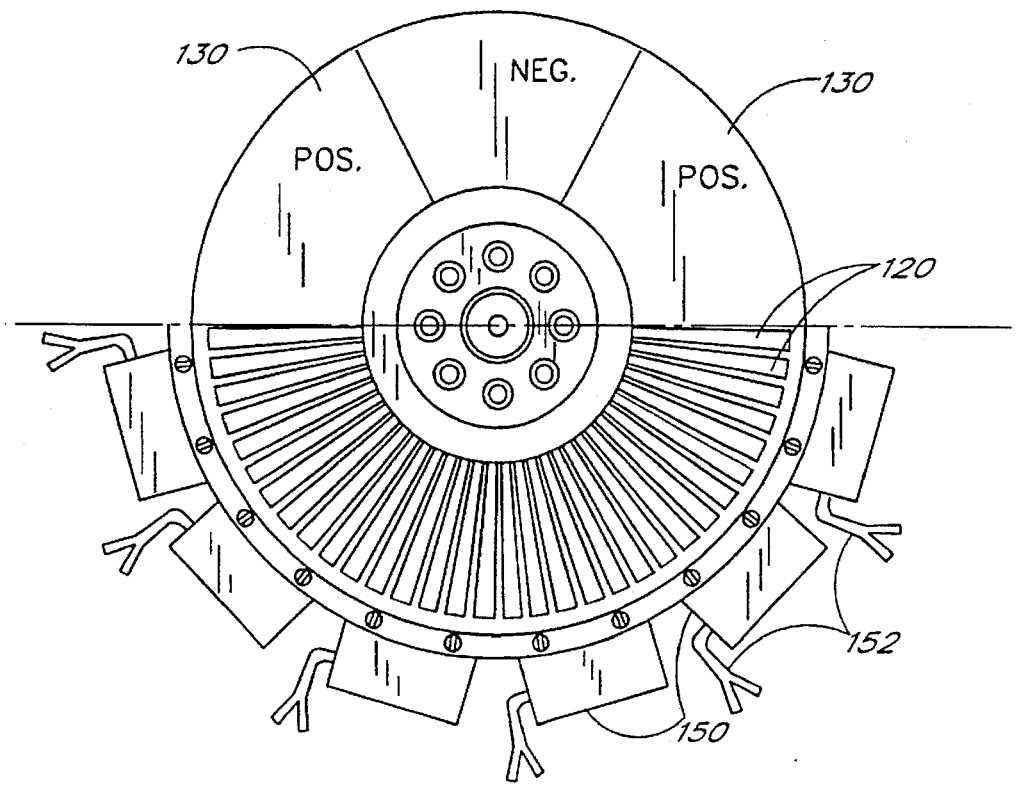
FIG. 2B is a cross-sectional view of the 10–18 magnet iron rotor with wiring slots with a charge and coil pick-up, and with a permanent relationship between the rotor and the charging coil pick-ups.

FIGS. 2A and 2B show the rotor assembly 200 in more detail. Specifically, in FIG. 2A, the rotor assembly 200 including the commutation 115, the coil winding 120, the shaft 102, and the bearing mountings 104, 106 are shown separately from the stator and chassis portion of the electric DC motor 100. FIG. 2A also shows the radius of the coil winding 120 required at the outside corners to reduce excess corner flux to the charged pick-up coils. Furthermore, as shown in FIG. 2B, the coil windings 100 wound in between the pairs of magnets 130 are shown in a cutaway top view. Finally, the alternating polarity of the 6-pole magnet configuration of the present invention is depicted clearly on FIGS. 2B and 3B.

Figure 3A:
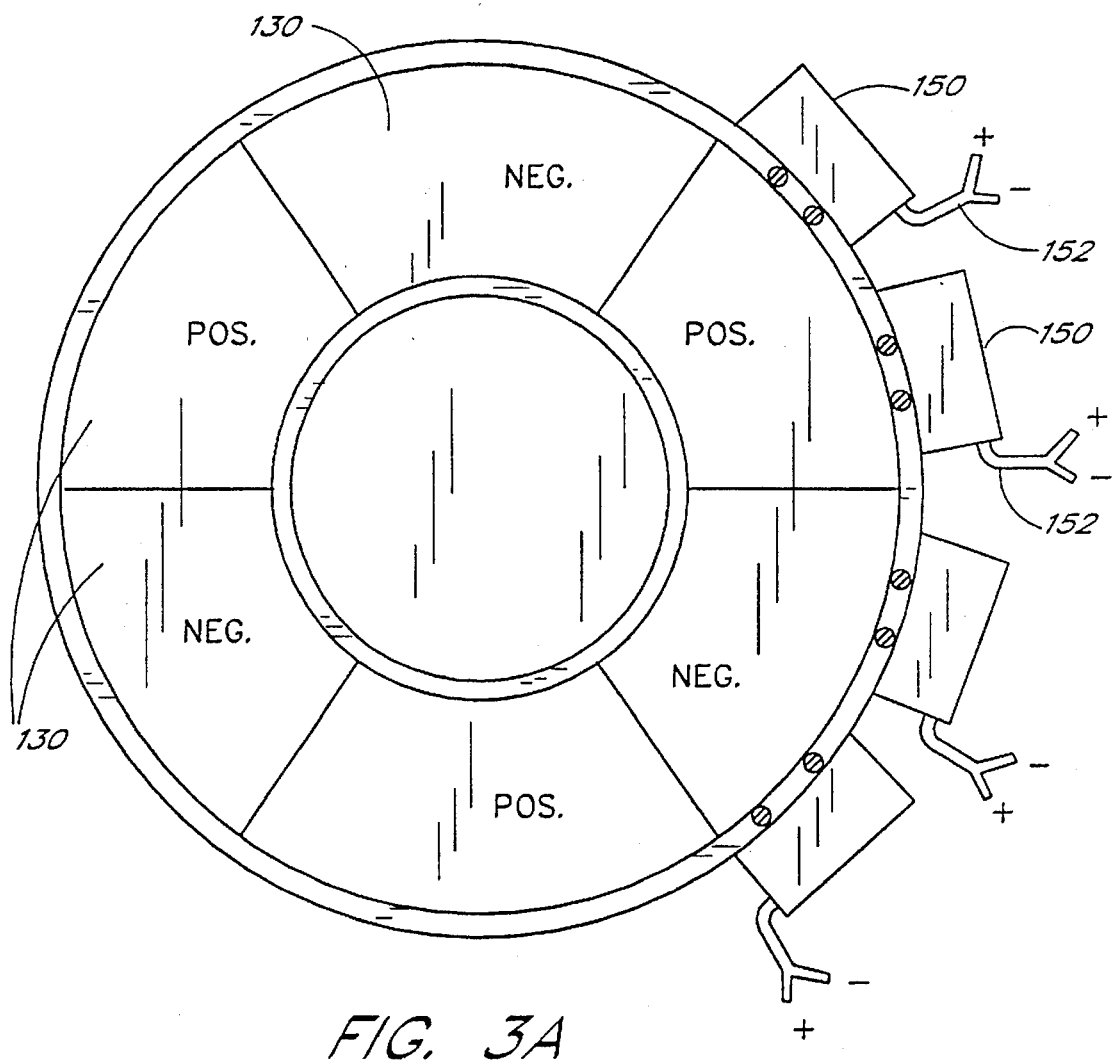
FIGS. 3A and 3B are, respectively, the top and side cross-sectional views of the electric DC motor assembly.
Figure 3B:
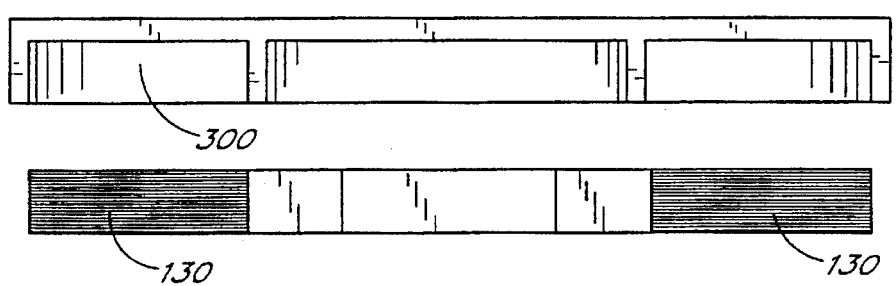

FIG. 3A shows a side exploded cross-sectional view of a pair of the permanent magnets 130 and the mounting receptacles 300 within a portion of the housing 140.

Figure 4A:
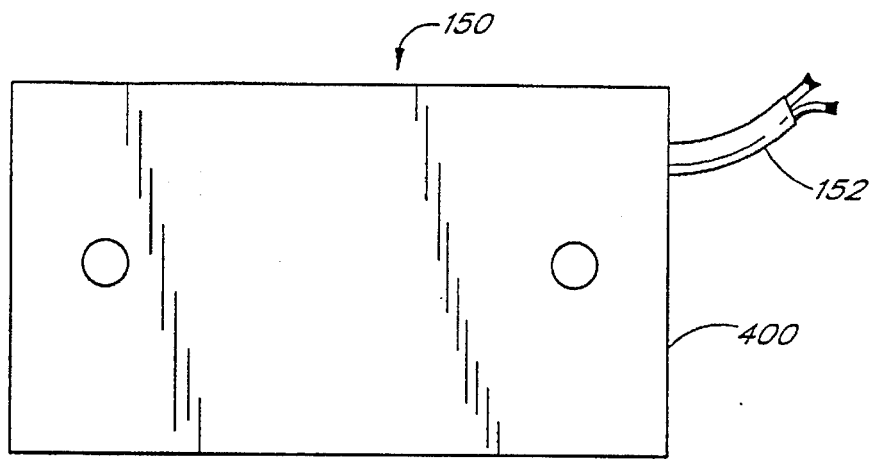
FIGS. 4A through 4D depict the charging pick-up coil and frame support used in accordance with the present invention.
Figure 4B:
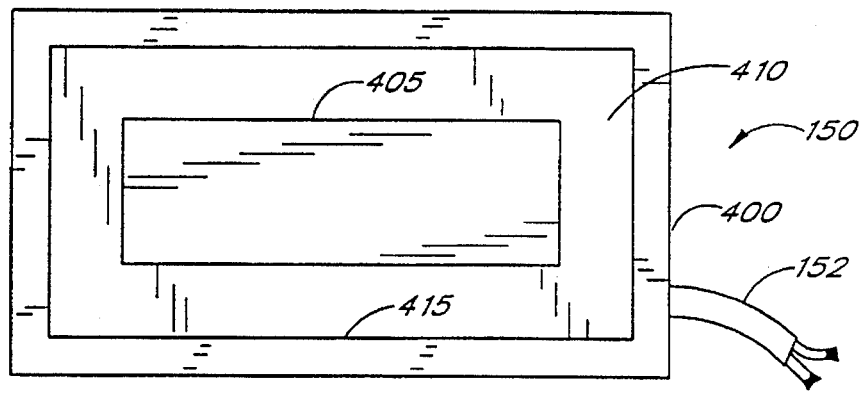

FIGS. 4A through 4D clearly depict the configuration of the pick-up coils 150 of FIGS. 1 through 3. Specifically, as shown in FIG. 4A, the coil pick-up 150 includes a frame support 400, while the wires 152 are protected by an insulating sheath. As shown on FIG. 4B, which is a cross-sectional view of the frame support 400, a frame core 405 is encompassed by a coil winding space 410 which, in turn, is enclosed by a pick-up coil housing 415.

Figure 4C:
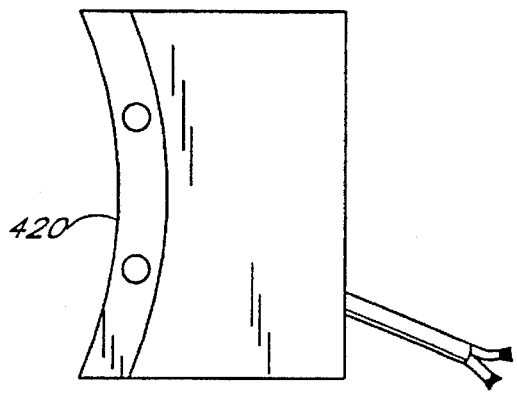
Figure 4D:
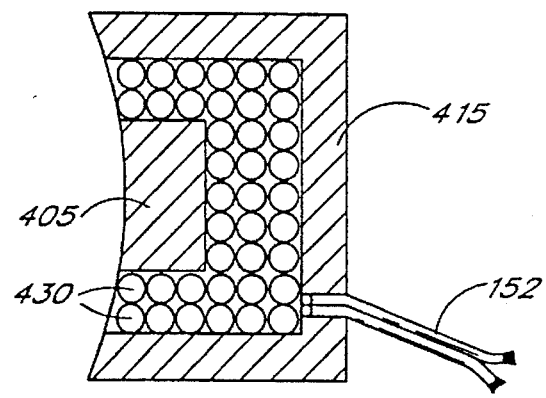

FIG. 4C is a top view of the pick-up coil 150 showing a rounded edge of the frame support 400 which is used to ensure that the coil pick-up 150 is flush with the circumference of the DC motor 100, while FIG. 4D is a top cross-sectional view which shows how wires 130 are wrapped within the pick-up coil 150.

Figure 5A:
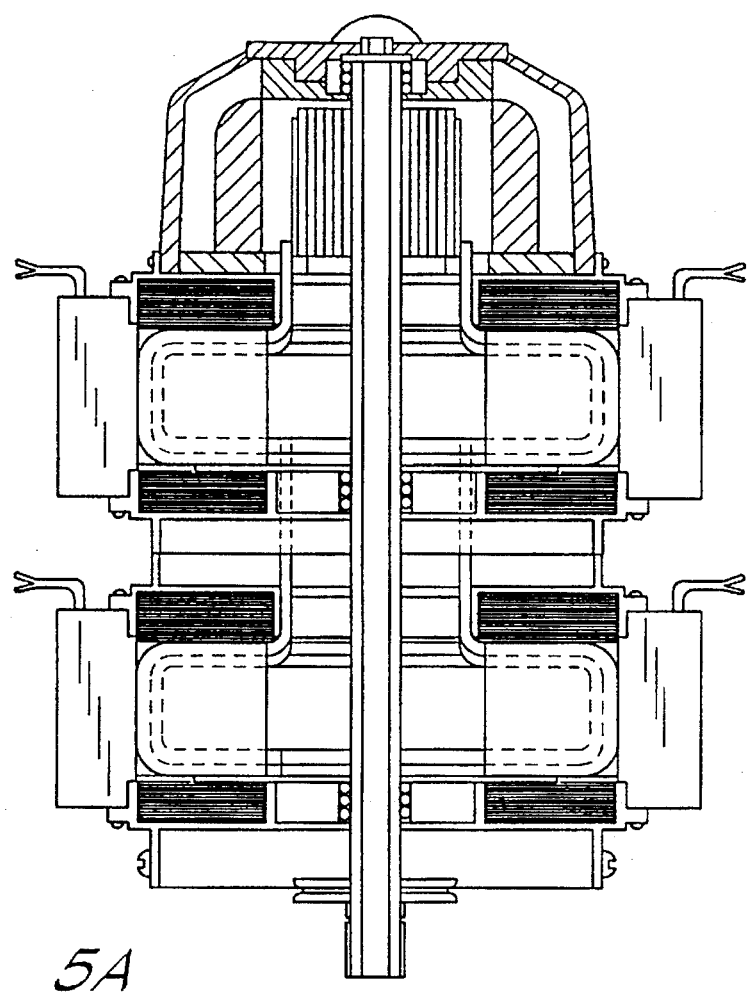
FIGS. 5A and 5B are, respectively, a side cross-sectional and a top view of the system used to increase the power by adding as many units as desired.
Figure 5B:
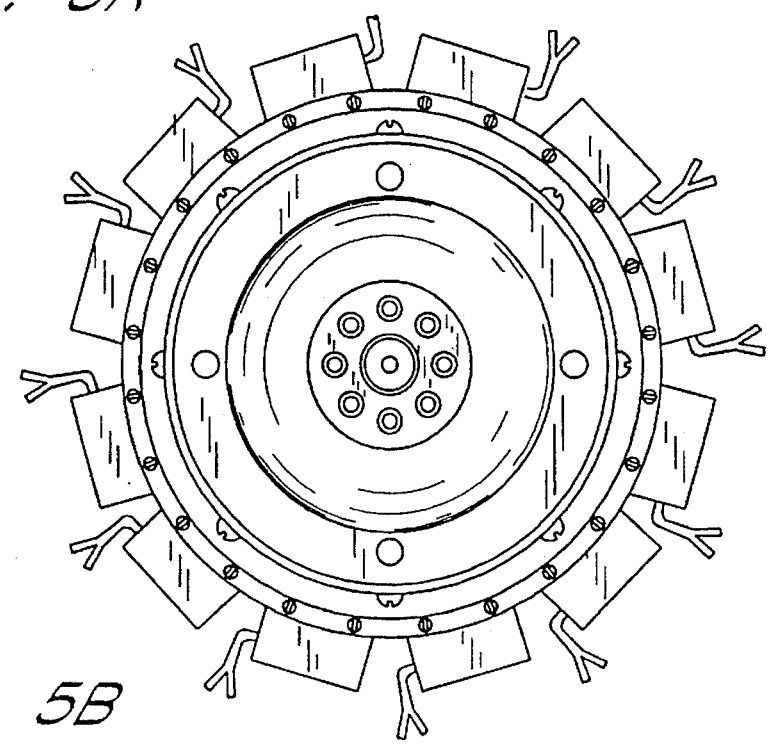

FIGS. 5A and 5B depict the electric motor of the present invention wherein a plurality of motor units can be connected in series to provide additional power output. It will be appreciated that as many units as desired may be connected in series as depicted in FIG. 5A. It will also be appreciated, that the energy output by the motor 100 as the coil windings 120 rotate within the motor 100 can be increased by increasing the number of pick-up coils 150 positioned around the circumference of the motor 100. Maximum efficiency will be obtained if substantially the entire circumference of the motor 100 is surrounded by pick-up coils such as pick-up coils 150.

Although the present invention has been described in detail above, it will be appreciated by those of ordinary skill in the art that certain obvious modifications may be made to the present invention without departing from its spirit or essential characteristics. Accordingly, the above description should be considered as illustrative and not restrictive and the scope of the present invention should be determined by the following appended claims.

What is claimed is:

1. A rotary electric DC motor system, comprising:

a rotor portion including a rotor coil winding mounted in a plurality of three faced slots, the rotor portion rotating about a center shaft in response to current supplied to said rotor coil winding from a battery; and a stator portion consisting of two circular rows of permanent magnets, the rows being spaced apart on opposite sides of said rotor coil winding and proximate thereto, so that said two rows of permanent magnets are axially spaced about said center shaft on a 10–18 iron frame support, said two rows of permanent magnets establishing a magnetic field therebetween so that said rotor coil winding cuts lines of flux in said magnetic field as said rotor coil winding rotates about said center shaft; and a plurality of a pick-up coil mounted circumferentially on said stator portion proximate to said rotor coil winding, and wherein said plurality of a pick-up coil is adapted to supply current to said battery for charging when a current is induced within said plurality of a pick-up coil by the rotation of said rotor coil winding so that said charging of said battery occurs simultaneously with said rotation of said rotor.

2. A DC motor system as defined in claim 1 wherein said pick-up coil output connected to said battery is under the control of a positive directed diode control circuit and wherein said diode directs a positive charge to the battery while the rotor portion is spinning.

3. A rotary electric DC motor system as defined in claim 1 wherein said pick-up coil is mounted as a part of a magnetic 10–18 housing assembly which supports said permanent magnets within said stator portion.

4. A rotary electric DC motor system as defined in claim 1 wherein said pick-up coil mounting is constructed from 10-18 iron.

5. A rotary electric DC motor system as defined in claim 1 wherein said permanent magnets are adjustable in position to generate the maximum output force of said electric motor.

6. A DC motor assembly as defined in claim 1 further including a commutator fixed end bearing used to hold rotor portion of said electric motor and restrain lateral movement of said rotor portion.

* * * * *